United States Patent [19]

Kilkenny

[11] Patent Number: 6,152,273
[45] Date of Patent: Nov. 28, 2000

[54] UNIVERSAL ARM AND MOUNTING BLOCK FOR A CURRENT COLLECTOR

[75] Inventor: Stephen W. Kilkenny, Menomonee Falls, Wis.

[73] Assignee: MagneTek, Inc., Nashville, Tenn.

[21] Appl. No.: 09/027,052

[22] Filed: Feb. 20, 1998

[51] Int. Cl.⁷ ...................................................... B60L 5/00
[52] U.S. Cl. ............................ 191/58; 191/60.3; 191/68; 191/64
[58] Field of Search .................................... 191/45 R, 50, 191/57, 58, 59, 59.1, 60, 60.2, 60.3, 64, 65, 66, 68, 70

[56] References Cited

U.S. PATENT DOCUMENTS

| | | | |
|---|---|---|---|
| 1,692,893 | 11/1928 | Gutzat | 191/58 |
| 1,826,854 | 10/1931 | Wilmot | 191/58 |

FOREIGN PATENT DOCUMENTS

| | | |
|---|---|---|
| 62-40001 | 2/1987 | Japan . |
| 63-202202 | 8/1988 | Japan . |
| 3-89801 | 4/1991 | Japan . |
| 5-95603 | 4/1993 | Japan . |
| 7-255102 | 10/1995 | Japan . |
| 9-200903 | 7/1997 | Japan . |

*Primary Examiner*—Mark T. Le

*Attorney, Agent, or Firm*—Waddey & Patterson; David B. Pieper

[57] ABSTRACT

A current collector assembly for positioning a current collecting shoe into electrical contact with an electrified rail for use with a mobile unit. The collector assembly includes a pair of identical mounting blocks which are used to mount the collector assembly to the mobile unit. The mounting blocks can be used with either a single collector head configuration or a dual collector head configuration. The collector assembly includes a universal support arm that can be used either alone or in combination with a second identical support arm to connect a collector head to the mounting block. The universal support arm includes a main body and a first and a second end. The first end extends at an angle with respect to the main body and is connected to a connecting rod passing through the mounting block. The second end of the support arm includes a pair of mounting holes which are used to connect the support arm to the collector head. In the single arm embodiment, a pair of connectors affix the support arm to the collector head, while in the dual arm embodiment, a single connector secures each of the support arms to the collector head. Since the support arms and the mounting blocks for both the single arm and dual arm configurations are identical, the universal support arm and mounting block of the invention reduces the number of components required for switching between a single arm and a dual arm configuration.

15 Claims, 3 Drawing Sheets

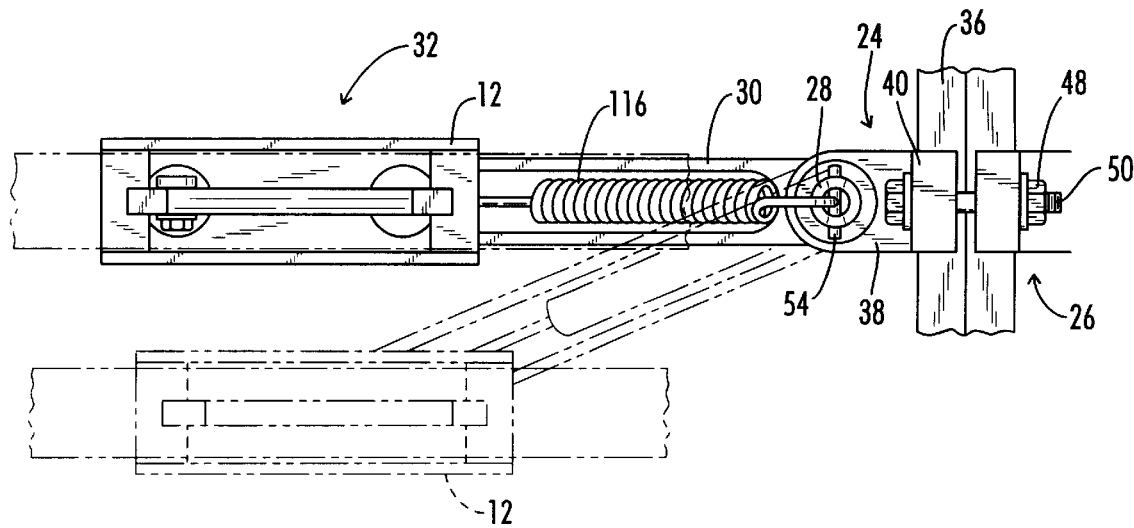
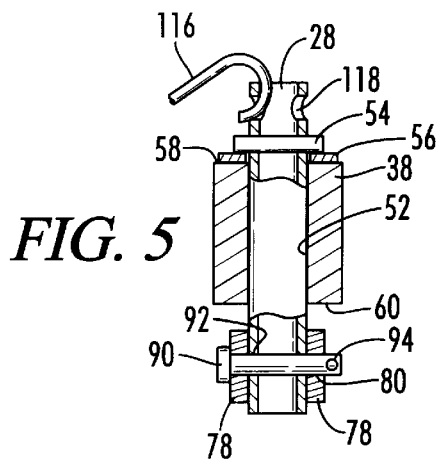
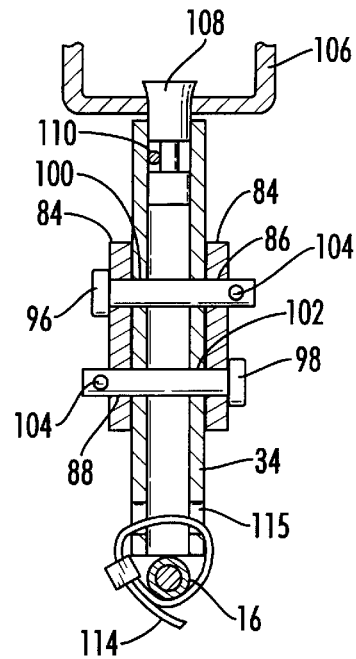
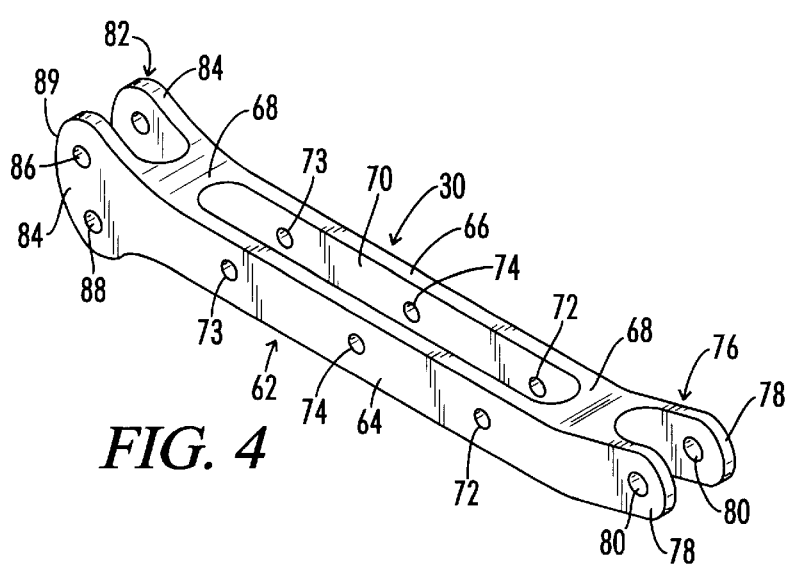

UNIVERSAL ARM AND MOUNTING BLOCK FOR A CURRENT COLLECTOR

BACKGROUND OF THE INVENTION

The present invention relates generally to a collector assembly for positioning a collector shoe in contact with an electrified rail. More specifically, the invention relates to a collector assembly incorporating a universal mounting block and a universal support arm that can be used in a single or dual arm configuration to provide the required force to bias the collector shoe into contact with the electrified rail when the collector assembly is mounted to a mobile unit.

Electrically powered mobile units such as trains, trolleys, conveyors, cranes, hoists or the like, require considerable amounts of continuous, uninterrupted current to function properly. Overhead electrical cranes that are utilized in heavy industries, for example, are required to run over large areas in which heavy objects must be moved. In these types of operating environments, the electric crane moves along and is supported by a pair of rails. A third, electrified rail is used to provide power to the electric crane. Typically, the crane or mobile unit includes at least one collector shoe that slides along the electrified rail while maintaining contact with the rail. Each collector shoe is connected to the mobile unit by a mounting arrangement that typically includes either a single support arm or a pair of support arms. In either the single or dual arm configuration, a spring provides the required bias force to hold the collector shoe in contact with the electrified rail. Although the dual arm configuration increases the cost of the collector assembly, the dual arm configuration is better able to keep the collector shoe in a constant plane, thereby decreasing the chances that the collector shoe will come out of contact with the electrified rail.

When switching between a single arm and a dual arm configuration, the entire mounting arrangement is removed from the mobile unit and the desired mounting arrangement is then attached. Typically, in a single arm configuration, the support arm and the mounting block that provides the connection to the mobile unit have a different structure from the support arms and the mounting block used in a dual arm configuration. The differences between the single and dual arm components are dictated by the different path of movement of the arms in each type of configuration. For example, a conventional single support arm cannot be used with another identical single support arm in a dual arm configuration, since the design of the support arm used in the single arm configuration includes several bends that would cause a pair of single arms used in a dual arm configuration to contact one another, thereby limiting the range of movement of the mounting assembly.

Since the presently available single and dual arm assemblies each include different support arms and mounting blocks, two types of support arms and mounting blocks must be manufactured and maintained in inventory. The two different types of components thereby increase the manufacturing and sale price of the collector assembly. Therefore, it would be particularly desirable to develop a universal support arm and a universal mounting block each of which can be used in either a single arm configuration or a dual arm configuration in order to reduce the number of parts manufactured and stored in inventory.

It is an object of the present invention to provide a collector assembly which can be configured as either a single arm assembly or dual arm assembly without the requirements for specialized parts depending upon which configuration is selected.

It is another object of the invention to provide a universal support arm that has a specialized configuration such that the universal support arm can be used either in a single arm or a dual arm collector assembly.

It is a further object of the invention to provide a universal mounting block that supports the collector assembly regardless of whether the collector assembly is a single arm configuration, a dual arm configuration, or a single or dual arm configuration supporting either a single collector head or a pair of collector heads.

Finally, it is an object of the invention to reduce the number of components required for a collector assembly that is usable in either a single arm or a dual arm configuration.

BRIEF SUMMARY OF THE INVENTION

The present invention is a collector assembly incorporating a universal mounting block and universal support arm for positioning a collector shoe in contact with an electrified rail. The collector assembly of the invention can be configured as a dual arm or a single arm collector assembly that supports either a single or a pair of collector heads.

The collector assembly of the invention includes a pair of identical mounting blocks that are connected to an attachment bar contained on a mobile unit, such as an overhead crane. Each of the mounting blocks contains a body that extends along a longitudinal axis. A connecting rod is rotatably positioned within a bore passing through the mounting block body. The connecting rod is oriented perpendicular to the longitudinal axis of the mounting block body.

In a single arm collector assembly, one of the universal support arms is connected to the connecting rod passing through the mounting block body. A first end of the support arm is pivotally attached to the connecting rod, while a second end of the support arm is attached to the collector head. The universal support arm includes a main body extending along a longitudinal axis and the first and second end portions. The first end of the support arm is connected to the main body at an angle relative to the longitudinal axis of the main body. Three sets of peg holes are contained in the main body of the support arm. In the single arm collector assembly configuration, a spring is connected between the connecting rod and a pin passing through one of the pair of peg holes to bias the support arm toward the electrified rail. In the single arm collector assembly, the second end of the support arm is securely fixed to the collector head by a pair of connectors, which function to provide a fixed, non-pivoting connection of the collector to the support arm.

In a dual arm collector assembly, a pair of the universal support arms are connected to the connecting rod passing through the mounting block body. Each of the support arms is pivotably connected at its first end to the connecting rod. A spring is connected between a pair of pegs passing through one of the peg holes in each of the support arms to bias the support arms toward the electrified rail. In the dual arm embodiment, the second end of each support arm is connected to the collector head by a single connector, which functions to provide a pivoting connection of the collector head to the support arms.

If the collector assembly of the invention is to be configured with a pair of collector heads, either a single support arm or a pair of support arms is mounted to a connecting rod passing through a second mounting block in the same manner as the first mounting block. If the collector assembly is to utilize only a single collector head, the second mounting block would not support a collector head, but would still be used to secure the collector assembly to the attachment bar of the mobile unit.

Other objects and advantages of the invention will appear in the course of the following description.

BRIEF DESCRIPTION OF THE DRAWINGS

The drawings illustrate the best mode presently contemplated of carrying out the invention.

In the drawings:

FIG. 3 is a top view of FIG. 2 showing the range of motion of the support arm and the collector shoe;

FIG. 4 is an isometric view of the universal support arm of the present invention;

FIG. 5 is a sectional view taken along line 5—5 in FIG. 2;

FIG. 6 is a sectional view taken along line 6—6 in FIG. 2;

DETAILED DESCRIPTION OF THE PREFERRED EMBODIMENT

Figure 1:
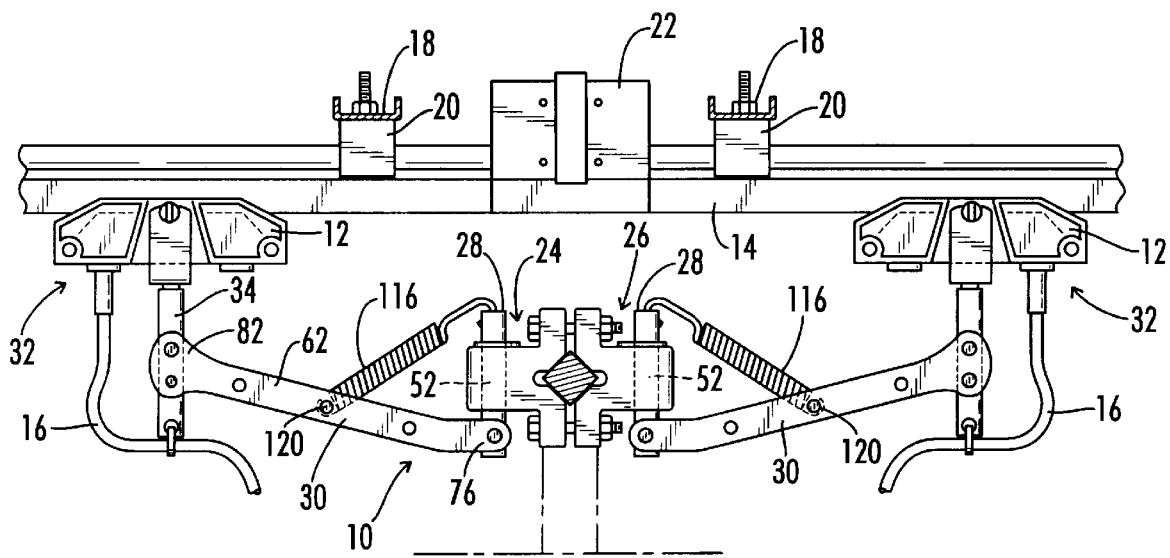
FIG. 1 is a front view showing the mounting arrangement of the present invention for biasing a pair of collector shoes into contact with an electrified rail incorporating the single universal support arm configuration.

Referring first to FIG. 1, the collector assembly of the present invention is shown at 10. The collector assembly 10 provides the required bias force to maintain the proper contact between a pair of collector shoes 12 and an electrified rail 14. The entire collector assembly 10 is mounted to a mobile unit (not shown), such as an overhead crane, hoist, trolley, or other similar type machine run by electric power. Each of the collector shoes 12 slides along the electrified rail 14 and provides a path for current to flow from the electrified rail 14 to the mobile unit through a pair of wires 16. Since the mobile unit is powered by electricity, it is important that the collector shoes 12 maintain continuous electrically conductive contact with the rail 14.

The electrified rail 14 includes a plurality of mounting brackets 18 which are connected to the electrified rail 14 through a hanger assembly 20 in a conventional manner. A power feed assembly 22 is connected to the electrified rail 14 to provide the required power to energize the rail 14.

Since the mobile unit is driven by a mechanism, such as an electric motor, remotely located from the electrified rail 14, it is important that the mounting arrangement 10 allows the collector shoes 12 to maintain continuous electrical contact with the electrified rail 14 as the mobile unit travels. Typically, the mobile unit is subject to vibrations and other types of slight movements such that the collector assembly 10 must be resilient to maintain the electrical connection between the collector shoes 12 and the electrified rail 14.

Figure 2:
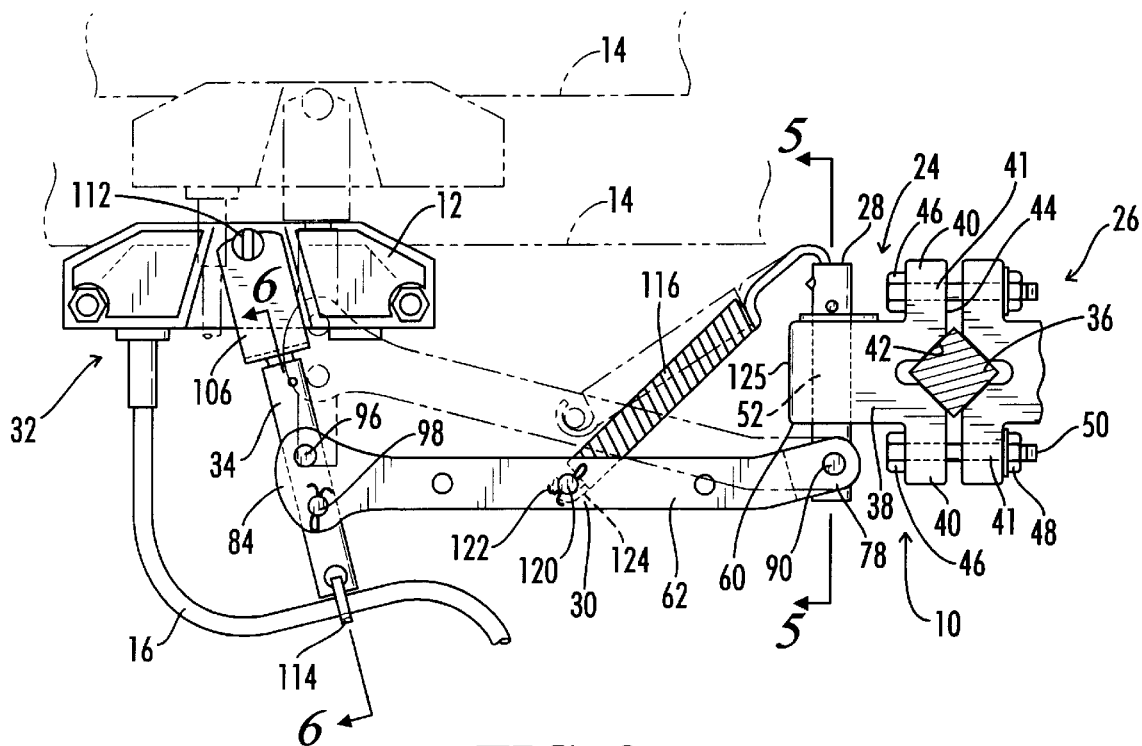
FIG. 2 is a detailed front view of a portion of FIG. 1 showing the movement of the support arm and the collector shoe.

The collector assembly 10 generally includes a pair of mounting blocks 24 and 26, at least one connecting rod 28, at least one universal support arm 30, and at least one collector head 32 including the collector shoe 12 and a shaft 34. Referring to FIG. 2, the collector assembly 10 is securely fixed to the mobile unit by interaction between the pair of identical mounting blocks 24 and 26 and an attachment bar 36 contained on the mobile unit. The attachment bar 36 is a conventional component of the mobile unit that is used as a point of connection between the collector assembly 10 and the mobile unit.

In the preferred embodiment of the invention, the attachment bar 36 is a solid metal or plastic bar having a diamond shaped rectangular cross-section, as clearly shown in FIGS. 1 and 2, although it is understood that any other satisfactory non-circular cross-section could be employed for attachment bar 36. Since each of the mounting blocks 24 and 26 are identical, only mounting block 24 will be discussed in detail. The mounting block 24 includes a main body portion 38 and a pair of attachment flanges 40. The main body portion 38 extends along a longitudinal axis that is generally horizontal, with reference being made to FIG. 2, and perpendicular to the longitudinal axis of attachment bar 36. Each of the attachment flanges 40 extends vertically outward from the main body portion 38 and includes a horizontal bore 41 which passes completely through the flange 40. The body portion 38 of the mounting block 24 includes a generally V-shaped groove 42 formed in its flat, inner face surface 44. The groove 42 extends along the entire length of the mounting block 24 and generally is formed to mate with the outer edge surfaces of attachment bar 36 as clearly shown in FIG. 2.

The pair of mounting blocks 24 and 26 is attached to the attachment bar 36 of the mobile unit by positioning one of the mounting blocks 24, 26 on either side of the attachment bar 36 such that the attachment bar 36 is received in the groove 42. When the mounting blocks 24, 26 are correctly aligned as shown in FIG. 3, the bores 41 contained in the flanges 40 of mounting block 24 are aligned with the corresponding bores 41 in mounting block 26. A connector 46 is inserted through each of the bores 41 contained in the attachment flanges 40 of the mounting blocks 24 and 26 both above and below the attachment bar 36. After the connectors 46 are properly positioned, a threaded nut 48 is tightened along threaded shaft 50 on each connector 46 to pull the mounting blocks 24 and 26 together and into contact with the attachment bar 36. Once the nuts 48 have been sufficiently tightened, the frictional engagement between the angled surfaces defined by each of the grooves 42 and the corresponding outer surfaces of the attachment bar 36 functions to clamp attachment bar 36 between mounting blocks 24 and 26, to securely hold the mounting blocks 24 and 26 in position along the attachment bar 36.

Each of the mounting blocks 24 and 26 is constructed to allow a hollow connecting rod 28 to pass through a bore 52 contained in the body portion 38. In the preferred embodiment of the invention, the bore 52 is perpendicular to the longitudinal axis of the mounting block body 38, such that the bore 52 extends along a generally vertical axis when the collector assembly 10 is mounted to the mobile unit as shown in FIGS. 1 and 2. Upper and lower end portions of the connecting rod 28 extend above and below the mounting block body 38 such that a variety of connections can be made to the mounting blocks 24 and 26 through the connecting rod 28 as will be discussed below. Preferably, the connecting rod 28 is freely rotatable within the bore 52 and is prevented from passing completely through bore 52 by a pin 54 extending through the mounting rod 28 as is most clearly shown in FIG. 5. The pin 54 has a length greater than the diameter of bore 52, such that the connecting rod 28 cannot completely pass through the bore 52 when the pin 54 is in place. A washer 56 surrounds the connecting rod 28 and is positioned between the pin 54 and an upper face surface 58 of the mounting block body 38 to prevent wear on the upper face surface 58.

In the first embodiment of the invention shown in FIGS. 1–6, a single support arm 30 is connected to the lower portion of the connecting rod 28 extending below a lower face surface 60 of the mounting block body 38.

FIG. 4 illustrates in detail the universal support arm 30 utilized in each embodiment of the present invention. The support arm 30 generally includes a main body 62 that extends lengthwise along a longitudinal axis. The main body 62 includes a pair of side rails 64 and 66 extending lengthwise along the longitudinal axis of the main body 62. The pair of side rails 64 and 66 are joined by a pair of web portions 68 which provide the required stability and strength for the main body 62. The side rails 64 and 66 and webs 68 define an internal cavity 70 contained within the main body 62. The internal cavity 70 is open at both the top and the bottom such that the support arm 30 includes a hollow center section. A first set of peg holes 72 are contained in each of the opposite side rails 64, 66 and are aligned with one another. A second pair of peg holes 73 are also contained in each of the side rails 64, 66 and are also aligned with one another. A third, center pair of peg holes 74 are positioned between the first pair of peg holes 72 and the second pair of peg holes 73.

The support arm 30 includes a first end 76 extending from the main body 62 at an angle relative to the longitudinal axis passing lengthwise through the main body 62. In the preferred embodiment of the invention, the first end 76 extends at an angle of approximately 15° relative to the longitudinal axis of main body 62. The first end 76 includes a pair of flanges 78, each of which includes an attachment hole 80. The flanges 78 are spaced apart from one another by a distance sufficient to accommodate the outer diameter of the connecting rod 28, as will be discussed below.

Extending from the opposite end of the support arm body 62 is a second end 82, which includes a second pair of flanges 84. Each of the flanges 84 contains an upper hole 86 and a lower hole 88 which are aligned with the corresponding hole contained on the opposite flange 84. Each of the flanges 84 has a height greater than the height of the support arm body 62 and includes a radiused outer edge surface 89, as can be seen in FIG. 2. In the preferred embodiment of the invention, the inside surface of each flange 84 is spaced from the inside surface of the other flange 84 by a distance sufficient to accommodate the outer diameter of shaft 34, as shown in FIG. 6.

In the preferred embodiment of the invention, the universal support arm 30 is constructed of a durable plastic. The support arm 30, including the main body 62, the first end 76 and the second end 82 is preferably integrally formed as a single molded structure.

Referring to FIGS. 1, 2 and 5, in the first embodiment of the invention, a single support arm 30 is connected to the lower portion of the connecting rod 28 extending below the lower face surface 60 of the mounting block body 38. Specifically, the connecting rod 28 is positioned between the flanges 78 on the first end 76 of the support arm 30. A connector 90 passes through the attachment holes 80 in the flanges 78 and a pair of aligned holes 92 contained in the connecting rod 28, as can be seen in FIG. 5. A pin 94 securely holds the connector 90 between the pair of flanges 78 such that the support arm 30 is pivotally connected to the connecting rod 28 about a pivot axis defined by the connector 90.

Referring now to FIGS. 2 and 6, the second end 82 of the support arm 30 is securely fixed to the shaft 34 of collector head 32 by a pair of connectors 96 and 98. Specifically, shaft 34, which is hollow, is positioned between the pair of flanges 84 contained on the second end 82 of the support arm 30. With the shaft 34 positioned between the flanges 84, the connector 96 is inserted through the upper hole 86 in each flange 84 and a pair of aligned upper holes 100 formed in the shaft 34. Likewise, the second connector 98 is inserted through the lower hole 88 in each of the flanges 84 and a pair of aligned lower holes 92 in the shaft 34. A pin 104 holds each of the connectors 96 and 98 in place between the flanges 84 such that the support arm 30 is securely connected to the shaft 34. Since a pair of connectors 96 and 98 secure the second end 82 of the support arm 30 to the shaft 34, the orientation of shaft 34 relative to support arm 30 is fixed and cannot pivot, as is shown in phantom in FIG. 2.

A clevis 106 is rotatably connected to the upper end of shaft 34 by a swivel connector 108, as shown in FIG. 6. The swivel connector 108 is retained in the hollow shaft 34 by a pin 110 such that the clevis 106 cannot become detached from the top end of shaft 34 while still being able to rotate with respect to shaft 34.

As can be seen in FIG. 2, the spaced side arms of clevis 106 are each pivotally connected to one side of the collector shoe 12 by a pin 112. The pivoting connection between the clevis 106 and the collector shoe 12 allows the collector shoe 12 to remain in the same plane as the electrified rail 14 and maintain electrical contact with the rail 14 as the collector head 32 moves up and down as shown in phantom in FIG. 2. The cable 16 that conducts current from the electrified rail 14 is secured to the bottom end of shaft 34 by an adjustable strap 114 that passes through a pair of aligned holes 115 in the bottom end of shaft 34.

In order to maintain electrical contact between the collector shoe 12 and the electrified rail 14, an upward bias force must be provided on the support arm 30. In the single arm embodiment shown in FIGS. 1–6, the upward bias force is provided by a spring 116. The spring 116 is joined at one end to the connecting rod 28 by engaging a hook at one end of the spring 116 through one of a pair of aligned holes 118 in the connecting rod 28, as shown in FIG. 5. The second end of spring 116 is latched to a pin 120 passing through and retained in the center pair of aligned peg holes 74 contained in the main body 62 of support arm 30. A cotter pin 122 is used to retain the pin 120 within the center peg holes 74.

In the preferred embodiment, the second end of spring 116 contains a hook portion 124 that engages the pin 120 in the cavity 70 of support arm 30. Spring 116 is connected to the pin 120 inserted into the center pair of peg holes 74 such that the spring 116 is slightly stretched to provide upward bias force when the collector shoe 12 and support arm 30 are in their uppermost position. The upward movement of the collector shoe 12 is limited by the physical contact between the lower face 60 of the mounting block body 38 and the upper edge of the first end 76 of support arm 30. Shown in phantom in FIG. 2 is a typical position for the collector shoe 12 between its uppermost and lowermost positions relative to the mounting blocks 24 and 26. The downward rotation of the support arm 30 is controlled by the position of the electrified rail 14 relative to the upper edges of mounting blocks 24 and 26.

Referring now to FIG. 3, it can also be seen that the support arm 30 and collector head 32 can rotate about a vertical axis defined by the connecting rod 28 as is shown in phantom. Since the connecting rod 28 is freely rotatable within the bore 52 formed in the mounting block body 38, the support arm 30 can pivot to compensate for movement of the mobile unit while maintaining contact with the electrified rail 14.

As the collector head 32 moves downward relative to the mounting blocks 24 and 26, the support arm 30 pivots about the connector 90 passing through the first end 76 of the support arm 30. As the support arm 30 moves downward, the collector shoe 12 pivots about pins 112 relative to the clevis 106 such that the collector shoe 12 remains in a constant horizontal plane to maintain contact with the electrified rail 14. Since the collector shoe 12 pivots about pins 112 to maintain contact with electrified rail 14, it is desirable to prevent rotation of shaft 34 relative to the support arm 30. For this reason, the pair of connectors 96 and 98 is used between the second end 82 of the support arm 30 and the shaft 34. Thus, as the support arm 30 pivots downward, the shaft 34 tips and is oriented non-perpendicular to the electrified rail 14.

Although the collector assembly 10 shown in FIGS. 1–6 includes a pair of collector heads 32, it should be understood that the collector assembly 10 could be modified to only include one collector head 32. In an embodiment having only one collector head 32, the identical mounting blocks 24 and 26 could still be utilized to secure the collector assembly 10 to the attachment bar 36 of the mobile unit. However, in an embodiment having only the collector head 32 attached to mounting block 24, for example, the connecting rod 28 passing through mounting block 26 is removed, and the mounting blocks 24 and 26 are used to secure the single collector assembly 10 to the mobile unit. Since the mounting blocks 24 and 26 are identical, the same parts are used for an embodiment having either a single collector head 32 or a pair of collector heads 32 as shown in the present embodiment. Thus, the number of parts needed to be maintained in inventory can be reduced by having a universal mounting block that can be used either in a collector assembly 10 having a single collector head 32 or a pair of collector heads 32.

As can be seen in FIGS. 1 and 2, the length of the first end 76 of the support arm 30 from the attachment holes 80 to the point of connection to the main body 62 is greater than the length of the mounting block body 38 extending outward past the connecting rod 28. The length of the first end 76 therefore positions the main body 62 of the support arm 30 past the outer end surface of the mounting block body 38, shown at 125, when the support arm 30 is attached to the connecting rod 28. Thus, the relatively straight main body 62 of the support arm 30 is located outward past the outer end surface 125, which increases the amount of possible vertical movement of the collector head 32 attached to the support arm 30. If the support arm 30 were a completely straight member, the point of connection between the support arm 30 and the connecting rod 28 would have to be located a greater distance below the lower face 60 of the mounting block body 38 to permit a comparable degree of rotation of the support arm 30. Therefore, the configuration of the universal support arm 30 of the present invention as shown and described allows the support arm 30 to be connected near the lower face 60 of the mounting block body 38 while still allowing the desired amount of rotation, to produce a compact overall package and minimize the space requirements for collector assembly 10.

Figure 7:
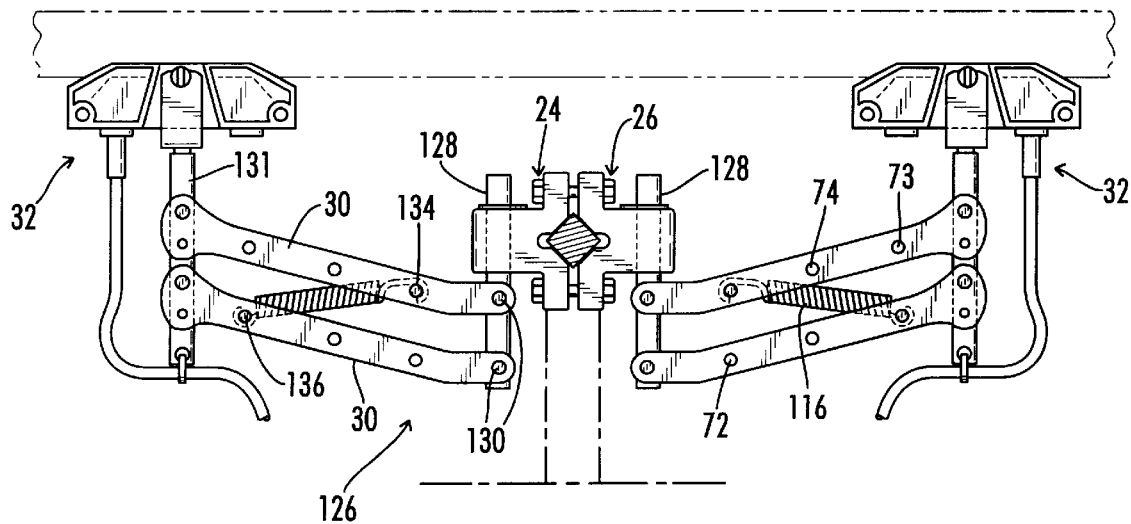
FIG. 7 is a front view showing the mounting arrangement of the present invention for biasing a pair of collector shoes into contact with an electrified rail incorporating the dual universal support arm configuration.
Figure 8:
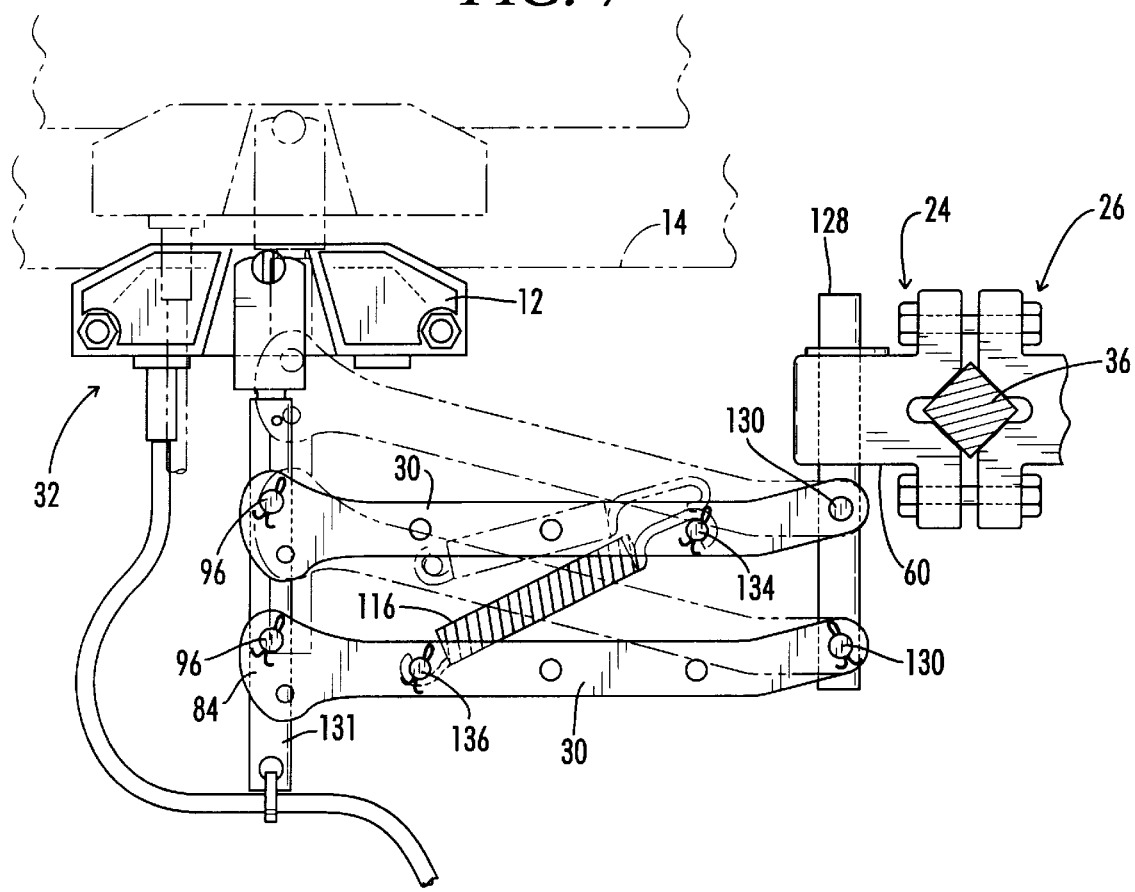
FIG. 8 is a detailed front view of a portion of FIG. 7 showing the movement of the support arms and the collector shoe.

FIGS. 7 and 8 show a dual arm collector assembly 126 of the second embodiment of the invention. The collector assembly 126 incorporates mounting blocks 24 and 26 to attach the collector assembly 126 to the attachment bar 36 of the mobile unit. Each of the mounting blocks 24 and 26 includes an extended connecting rod 128 that is similar to the connecting rod 28 shown in the first embodiment. The extended connecting rod 128 extends further from the lower face 60 of each mounting block 24 and 26 than the connecting rod 28. As can be clearly seen in FIGS. 7 and 8, the collector assembly 126 incorporates a pair of support arms 30 connected between each extended connecting rod 128 and the collector head 32. The support arms 30 shown in the dual arm collector assembly 126 are identical to the support arms 30 shown in the single arm configuration of FIGS. 1–6. The dual arm collector assembly 126 of the second embodiment increases the strength and stability of the assembly as compared to the single arm collector assembly 10.

Each of the support arms 30 connected to one of the extended connecting rods 128 is pivotally connected to the extended connecting rod 128 by a connector 130. Thus, each of the support arms 30 is rotatable about a pivot axis passing through the connector 130, as was the case in the first embodiment.

In contrast to the first embodiment, the second end 82 of each support arm 30 is connected to an extended shaft 131 of the collector head 32 by only the single connector 96 passing through the pair of upper holes 86 contained in each flange 84 of the second end 82. As previously discussed, the upper holes 86 in the second end 82 of the support arm 30 are located above the longitudinal center axis passing through the support arm body 62. Since a pair of support arms 30 are connected to the extended shaft 131, the connectors 96 prevent the extended shaft 131 from freely rotating with respect to the support arms 30. Thus, as the collector head 32 moves vertically, the pair of support arms 30 prevent the collector head 32 from rotating in an uncontrolled manner which would cause the collector shoe 12 to come out of contact with the electrified rail 14. Support arms 30 cooperate with collector head shaft 131 and connecting rod 128 to essentially define a parallelogram having a variable configuration according to the position of support arms 30 relative to connecting rod 28.

The collector shoe 12 is biased in the upward direction by the spring 116 connected between a first pin 134 secured in the first pair of peg holes 72 in the upper support arm 30 and a second pin 136 secured in the second pair of peg holes 74 in the lower support arm 30. The distance between the first pair of peg holes 72 in the upper support arm 30 and the second pair of peg holes 73 in the lower support arm 30 is such that the same size spring 116 can be used in both the single arm assembly and the dual arm assembly 126, thereby further reducing the number of components required. As can be understood in the Figures, the pin 134 through the upper support arm 30 and the pin 136 through the lower support arm 30 are closest to each other when the collector head 32 is in the uppermost vertical position. Thus, the force supplied by spring 116 biases the pair of support arms 30 in an upward direction to force the collector shoe 12 into contact with the electrified rail 14. The amount of upward rotation of the support arms 30 is limited by the physical contact between the lower face 60 of the mounting block body 38 and the top surface of the first end 76 of the upper support arm 30.

As the position of the collector shoe 12 varies relative to attachment bar 36 and mounting blocks 24, 26, the extended shaft 131 remains approximately perpendicular to the electrified rail 14, unlike the first embodiment as shown in FIG. 2. Because of the unique configuration of the universal support arm 30, particularly the first end 76 and second end 82, the distance between the upper and lower support arms 30 remains constant as the support arms 30 rotate, as can be seen in FIG. 8. Therefore, as the pair of support arms 30 rotate about the connectors 130, the support arms 30 will not contact each other and limit the range of motion of the collector head 32. Thus, the universal support arm 30, as shown in FIG. 4, can be used in both a single arm and a dual arm collector assembly as illustrated in the Figures. By having a universal support arm 30 which can be used in both a single and a dual arm configuration, the number of components required to be maintained in inventory is drastically reduced.

Again, although the collector assembly 126 shown in FIGS. 7–8 includes a pair of collector heads 32, it should be understood that the collector assembly 126 could be modified to only include a single collector head 32. In such an embodiment having only one collector head 32, the identical mounting blocks 24 and 26 would still be utilized to secure the collector assembly 126 to the attachment bar 36 of the mobile unit. However, in an embodiment having only the single collector head 32 attached to mounting block 24, for example, the connecting rod 128 passing through mounting block 26 could be removed, and the mounting block 26 would be used to secured the collector assembly 126 to the mobile unit. As previously discussed, since the mounting blocks 24 and 26 are identical, the same parts can be used for an embodiment having either a single collector head 32 or a pair of collector heads 32.

It is contemplated that the mounting rod 28 shown in the first embodiment and the extended mounting rod 128 shown in the second embodiment could be replaced by a single mounting rod similar to the expanded mounting rod 128 in order to further reduce the number of components necessary to manufacture and maintain in inventory. Additionally, the shaft 34 could also be replaced by the extended shaft 131 as shown in the second embodiment of FIGS. 7 and 8 to even further reduce the number of components.

The present invention provides a universal mounting block and a universal support arm which allow the collector assembly to be configured in either a single arm or dual arm fashion, with either a single or pair of collector heads, while eliminating the requirement for specialized parts based on the number of support arms being used. Thus, the invention increases the flexibility of the collector assembly, since it can be configured as a single or a dual arm structure without the requirements of specialized parts, as was typically required in the prior art.

Various alternatives and embodiments are contemplated as being within the scope of the following claims particularly pointing out and distinctly claiming the subject matter regarded as the invention.

I claim:

1. A current collector assembly for positioning a collector shoe in contact with an electrified rail for transmitting current from the electrified rail to a mobile unit, the assembly comprising:

a pair of substantially identical mounting blocks removably attached to the mobile unit, each mounting block including a mounting block body extending along a longitudinal axis;

a connecting rod passing through the longitudinal axis of the mounting block body of at least one of the mounting blocks, the connecting rod being generally perpendicular to the longitudinal axis of the mounting block body;

at least one support arm attached to each connecting rod, the support arm having a support arm body extending along a longitudinal axis, a first end, and a second end, the first end extending from the support arm body at a non-straight angle relative to the longitudinal axis of the support arm body and connected to the connecting rod, the second end of the support arm including a pair of flanges extending from the support arm body, each flange having a flange height greater than a body height of the support arm body, and each flange including a pair of aligned mounting holes; and at least one collector head including a collector shoe and a collector shaft pivotally mounted to the collector shoe, the collector head being connected to the second end of the support arm.

2. The collector assembly of claim 1, wherein the support arm body, the first end, and the second end are integrally formed with each other from a thermoplastic material.

3. The collector assembly of claim 1 wherein only one support arm is attached to each connecting rod.

4. The collector assembly of claim 3 wherein the support arm is fixed to the collector head by a pair of connectors passing through the pair of mounting holes and joining the second end of the support arm to the shaft of the collector head.

5. The collector assembly of claim 1 wherein two support arms are attached to each connecting rod, each support arm being pivotally connected to the collector head by a connector passing through one of the pair of mounting holes in the second end of the support arm and the shaft of the collector head.

6. The collector assembly of claim 1 wherein at least one of the pair of mounting holes contained in the second end of the support arm is positioned above the longitudinal axis of the support arm body.

7. The collector assembly of claim 6 wherein a connector passes through the pair of mounting holes positioned above the longitudinal axis of the support arm body and the shaft of the collector head.

8. The collector assembly of claim 1 wherein each mounting block includes a groove formed in the body and a pair of flanges extending from the body, such that when the pair of mounting blocks are aligned and attached by a plurality of connectors, a portion of the mobile unit is entrapped in the grooves, and the plurality of connectors extend through the flanges to attach the pair of mounting blocks to the mobile unit.

9. The collector assembly of claim 1, wherein the first end extends from the support arm body at an angle of approximately 15° relative to the longitudinal axis of the support arm body.

10. A current collector assembly for positioning a collector shoe in contact with an electrified rail for transmitting current from the electrified rail to a mobile unit, the assembly comprising:

a pair of substantially identical mounting blocks removably attached to the mobile unit, each mounting block including a mounting block body extending along a longitudinal axis;

a connecting rod passing through the longitudinal axis of the mounting block body of at least one of the mounting blocks, the connecting rod being generally perpendicular to the longitudinal axis of the mounting block body;

at least one support arm attached to each connecting rod, the support arm having a support arm body extending along a longitudinal axis, a first end, and a second end, the first end extending from the support arm body at a non-straight angle relative to the longitudinal axis of the support arm body and connected to the connecting rod, wherein the support arm is configured for both a single arm connection and a dual arm connection, wherein the single arm connection includes a pivotal connection to the connecting rod at the first end and a non-pivotal connection to the collector head at the second end, and wherein the dual arm connection includes a pivotal connection at both the first end to the connecting rod and the second end to the collector head; and at least one collector head including a collector shoe and a collector shaft pivotally mounted to the collector shoe, the collector head being connected to the second end of the support arm.

11. A method of biasing a collector head into contact with an electrified rail to provide current to a mobile unit, the method comprising the steps of:

provide a pair of identical mounting blocks each having a body and a mounting groove;

aligning the pair of mounting blocks to capture a portion of the mobile unit in the mounting grooves and between the pair of mounting blocks;

providing a plurality of identically constructed support arms, each having a main body extending along a longitudinal axis, a first end extending from the main body at a non-straight angle relative to the longitudinal axis of the main body, and a second end extending from the main body opposite the first end;

selectively determining the number of support arms to be used;

attaching the desired number of support arms to a connecting rod passing through the body of the mounting block;

attaching a collector head including a collector shoe and a shaft to the second end of each support arm;

providing a single connector between the second end of the support arm and the shaft of the collector head when two support arms are connected to each connecting rod and providing a pair of connectors between the second end of each support arm and the shaft of the collector head when a single support arm is attached to the connecting rod; and attaching a spring to the support arms to provide bias force to bias the collector head into contact with the electrified rail.

12. The method of claim 11 wherein when two support arms are connected to each connecting rod, the spring is connected between the support arms.

13. The method of claim 11 wherein when one support arm is attached to each connecting rod, a spring is connected between the connecting rod and the support arm.

14. A method of assembling a current collector for use in combination with a mobile unit to provide current to the mobile unit from an electrified mail, comprising the steps of:

providing a mounting arrangement for securement to the mobile unit;

providing a collector head having a mounting member;

providing a plurality of substantially identically constructed support arms, each support arm having a support arm body extending along a longitudinal axis, a first end, and a second end, the first end extending from the support arm body at a non-straight angle relative to the longitudinal axis of the support arm body, the second end of the support arm including a pair of flanges extending from the support arm body, each flange having a flange height greater than a body height of the support arm body, and each flange including a pair of aligned mounting holes; and assembling an arm collector assembly by selectively connecting either a single support arm assembly or a dual arm collector assembly, wherein connecting a single support arm assembly includes pivotably connecting a single support arm at one end to the mounting arrangement and non-pivotally connecting the other end to the mounting member, and wherein connecting a dual arm collector assembly includes pivotably connecting each of a pair of support arms at one end to the mounting arrangement and pivotably connecting each of the pair of support arms at the other end to the mounting member.

15. A current collector assembly for positioning a collector shoe in contact with an electrified rail for transmitting current from the electrified rail to a mobile unit, the assembly comprising:

a pair of substantially identical mounting blocks removably attached to the mobile unit, each mounting block including a mounting block body extending along a longitudinal axis;

a connecting rod passing through the longitudinal axis of the mounting block body of at least one of the mounting blocks, the connecting rod being generally perpendicular to the longitudinal axis of the mounting block body;

at least one support arm attached to each connecting rod, the supoort arm having a support arm body extending along a longitudinal axis, a first end, and a second end, the first end extending from the support arm body at a non-straight angle relative to the longitudinal axis of the support arm body and connected to the connecting rod;

at least one collector head including a collector shoe and a collector shaft pivotally mounted to the collector shoe, the collector head being connected to the second end of the support arm;

a spring with a first end and a second end, wherein the first end is fixably connected to the connecting rod, and the support arm further comprising a pair of peg holes extending through the support arm body, the peg holes providing a point of attachment for the second end of the spring to be used in connection with the current collector assembly.

* * * * *